Patented May 30, 1944

2,349,797

UNITED STATES PATENT OFFICE 2,349,797

ALKALI-SOLUBLE CARBOXYETHYL CELLULOSE ETHER

Louis H. Bock, Huntingdon Valley, and Alva L. Houk, Philadelphia, Pa., assignors to Röhm & Haas Company, Philadelphia, Pa., a corporation of Delaware No Drawing. Application January 17, 1942, Serial No. 427,205

4 Claims. (Cl. 260—231)

This invention relates to carboxyethyl ethers of cellulose which are insoluble in water and soluble in dilute solutions of alkali, and to a process for the preparation of said ethers.

Alkali-soluble, water-insoluble carboxyethyl cellulose ether with particularly useful and valuable properties is formed by reacting by mixing between about 5° C. and about 35° C. cellulose with a solution containing from about 15% to about 40% of a strongly basic, water-soluble hydroxide in an amount at least molecularly proportional to the glucose units of the cellulose and with about 0.2 to about 0.5 molecular proportion of acrylonitrile per glucose unit of the cellulose until the reaction mixture is extensible with a 5% to 10% solution of a strong hydroxide to form a substantially homogenous solution or paste.

The process is effective with any form of cellulose, including cotton, cellulosic bast fibers, regenerated cellulose, or wood pulp from which the usual impurities such as resins and lignin have been removed. The process yields the most valuable ethers when the cellulose has not been appreciably degenerated in its purification.

As the hydroxide or alkali there may be used an alkali metal hydroxide, such as sodium or potassium hydroxide, or a strongly basic quaternary ammonium hydroxide, such as benzyl trimethyl ammonium hydroxide, dibenzyl dimethyl ammonium hydroxide, tetraethyl ammonium hydroxide, etc., or mixtures of hydroxides, in an amount at least molecularly proportional to the cellulose, calculated on the conventional glucose or $C_6$ unit. Concentrations below 15% or above 40% cause the reaction to be too sluggish for practical use and do not permit proper solubility of the final product. For optimum results the concentration of the alkali solution should be about 20% to about 30%.

The reaction is conveniently carried out by mixing cellulose, preferably in a fibrous or finely divided state, with a solution of the alkaline catalyst. This mixture may be allowed to stand to ensure penetration of the cellulose by the alkaline solution and to render the cellulose more susceptible to reaction with the acrylonitrile. It is particularly advantageous to permit the mixture of cellulose and solution of alkali to stand when the solution contains only 15% to 20% alkali hydroxide. With higher concentrations of alkali standing or ageing is not essential, although somewhat better results may be obtained thereby.

In the preferred form of this invention the acrylonitrile is added after the alkali has been taken up by the cellulose, but the desired reaction may be effected by mixing acrylonitrile before or during the addition of the alkaline catalyst. Acrylonitrile reacts with cellulose in a relatively short time even at relatively low temperatures of 5° C. to 35° C. The reaction is best effected when the temperature of the reacting mixture is between 20° C. and 30° C. As the acrylonitrile is added, it is desirable to stir the mixture thoroughly and to continue stirring for a short time thereafter. The alkali-soluble material is often obtained in a half-hour. The reaction mixture may then be diluted with water or taken up with dilute caustic solution and for some applications may be used in such form.

If desired, the carboxyethyl cellulose ether formed in this process may be purified by adding acid to the reacted mixture or a solution thereof to precipitate the ether, which is insoluble in water. The precipitated material may then be separated and washed. The purified product may then be redissolved in a solution of 5% to 10% of an alkali hydroxide, a quaternary ammonium hydroxide, or a mixture of such hydroxides. The carboxyethyl cellulose ethers of this invention contain less than 0.5 carboxyethyl group per glucose unit of the cellulose.

Further details of the process are given in the following examples.

*Example 1*

170 parts of purified wood cellulose and 267 parts of a 30% sodium hydroxide solution were stirred in a mechanical mixer, at 30° C., for about 15 minutes. Then 10.6 parts of acrylonitrile was added and the mixing continued for 7 hours with the temperature remaining at about 30° C. The resulting mixture was taken up in 1500 parts of a 5% sodium hydroxide solution to give a viscous, slightly turbid solution containing 8% of cellulose in the form of the sodium salt of a carboxyethyl cellulose ether. This viscous solution was neutralized with hydrochloric acid with precipitation of the ether, which was separated, washed with water, and redissolved in an 8% sodium hydroxide solution.

*Example 2*

A mixture of 170 parts of a commercial cellulose of the grade known as "alpha flock," a highly purified cellulose pulp from wood, and 200 parts of a 40% sodium hydroxide solution was mechanically worked for an hour. The temperature of the mixture was 25° C. There was gradually added to the above mixture 21.2 parts of acrylonitrile with good agitation. Stirring was continued for three hours at room temperature (approximately 25° C.). The reaction mixture was then taken up with 1735 parts of a 5.2% sodium hydroxide solution to give a highly viscous solution of a carboxyethyl ether.

Example 3

A solution containing 15% of sodium hydroxide was cooled to 5°–7° C. and 530 parts of this solution was mixed with 170 parts of alpha cellulose from wood pulp. The mixture was placed in a closed container and stored overnight (16 hours) at 7° C. It was then transferred to a Werner-Pfleiderer mixer and, while it was worked mechanically therein, 21.2 parts of acrylonitrile was added. The temperature was allowed to rise to 25° C. and mixing was continued for seven hours, whereupon 1400 parts of 6.4% sodium hydroxide solution was added. A viscous solution resulted.

Example 4

170 parts of purified cellulose from cotton linters and 267 parts of 30% sodium hydroxide solution were mixed and stored in a closed container for 18 hours. To this mixture there was added 21.2 parts of acrylonitrile with thorough stirring. Stirring was continued for 90 minutes at about 24°–26° C. The reaction mixture was diluted with 1665 parts of 5.4% sodium hydroxide solution. A viscous solution resulted.

A portion of this solution was further diluted with a 5% solution of trimethyl benzyl ammonium hydroxide and used to impregnate a piece of 80 x 80 cotton sheeting, which was then squeezed, dipped in a bath of 5% sulfuric acid and 8% sodium sulfate, thoroughly rinsed, washed with soap solution, again rinsed, and dried. The treated fabric had a stiffness eight times that of the original cloth. The cloth was then laundered with soap and soda ash, rinsed, and dried. It retained its stiff finish.

Example 5

A mixture of 170 parts of alpha cellulose fibers and 400 parts of a 20% sodium hydroxide solution was stored overnight in a closed container. To this mixture was then added 26.5 parts of acrylonitrile, the reaction mixture stirred at 25° C. for one and a half hours, and this mixture diluted with 1500 parts of 6% sodium hydroxide solution. A clear, viscous solution resulted.

Example 6

170 parts of regenerated cellulose from viscose waste, 25 parts of acrylonitrile, and 400 parts of a 20% solution of sodium hydroxide were mixed at 7° C. for 16 hours. The mixture was then taken up in 1500 parts of a 6% sodium hydroxide solution to give a highly viscous solution.

Example 7

170 parts of alpha cellulose flock, 200 parts of a 40% solution of benzyl trimethyl ammonium hydroxide, and 21 parts of acrylonitrile were mixed two hours at about 5° C. The temperature of the mixture was then permitted to rise to about 25° C. 2000 parts of 6.5% sodium hydroxide solution was added to give a clear solution of moderate viscosity.

By reacting cellulose, alkali, and acrylonitrile within the temperature limits of 5° C. to 35° C. in the proportions above-specified, there is obtained a water-insoluble, alkali-soluble carboxyethyl cellulose ether which imparts a high degree of viscosity to its solutions. In the preparation of this ether the cellulose undergoes a minimum degree of degradation and its properties depend in part upon this consideration. The ether obtained is useful as a thickening agent, as a protective colloid for preparing emulsions, dispersions, etc., as a sizing and finishing agent for textiles, etc. Because of its nature and properties it may be ejected from orifices to give fibers, films and the like, which are coagulated in acid media.

We claim:

1. The process of preparing a water-insoluble, alkali-soluble carboxyethyl cellulose ether which comprises reacting by mixing within the temperature range of 5° and 35° C. cellulose, a solution containing about 15% to about 40% of a strongly basic, water-soluble hydroxide in an amount at least molecularly equivalent to the glucose units of the cellulose, and about 0.2 to about 0.5 molecular proportions of acrylonitrile per glucose unit of the cellulose.

2. The process of preparing a water-insoluble, alkali-soluble carboxyethyl cellulose ether which comprises reacting by mixing within the temperature range of 20° C. and 30° C. cellulose, a solution containing about 20% to about 30% of an alkali metal hydroxide in an amount at least molecularly proportional to the glucose units of the cellulose, and then about 0.2 to about 0.5 molecular proportions of acrylonitrile per glucose unit of the cellulose.

3. The process of preparing a water-insoluble, alkali-soluble carboxyethyl cellulose ether which comprises reacting by mixing within the temperature range of about 20° C. and about 30° C. cellulose, a solution containing about 20% to about 30% of sodium hydroxide in an amount at least molecularly proportional to the glucose units of the cellulose and about 0.2 to about 0.5 molecular proportions of acrylonitrile per glucose unit of the cellulose, and taking up the reaction mixture with a 5% to 10% solution of sodium hydroxide.

4. A water-insoluble β-carboxyethyl cellulose ether which is soluble in 5% to 10% aqueous solutions of sodium hydroxide and which contains less than 0.5 carboxyethyl groups per glucose unit of the cellulose.

LOUIS H. BOCK.
ALVA L. HOUK.